US008362414B2

(12) United States Patent
Charvat et al.

(10) Patent No.: US 8,362,414 B2
(45) Date of Patent: Jan. 29, 2013

(54) METHOD AND APPARATUS FOR PROVIDING A SAMPLE FOR A SUBSEQUENT ANALYSIS

(75) Inventors: Ales Charvat, Göttingen (DE); Henning Urlaub, Göttingen (DE); Bernd Abel, Dransfeld (DE); Erdmann Rapp, Magdeburg (DE)

(73) Assignees: Max-Planck-Gesellschaft zur Forderung der Wissenschaften E.V, Munich (DE); Georg-August-Universitat Gottingen Stiftung des Offentlichen Rechts, Gottingen (DE)

( * ) Notice: Subject to any disclaimer, the term of this patent is extended or adjusted under 35 U.S.C. 154(b) by 360 days.

(21) Appl. No.: 12/669,141

(22) PCT Filed: Jul. 14, 2008

(86) PCT No.: PCT/EP2008/005736
§ 371 (c)(1), (2), (4) Date: Apr. 29, 2010

(87) PCT Pub. No.: WO2009/010262
PCT Pub. Date: Jan. 22, 2009

(65) Prior Publication Data
US 2010/0230586 A1 Sep. 16, 2010

(30) Foreign Application Priority Data
Jul. 16, 2007 (EP) .................................... 07013904

(51) Int. Cl.
*B01D 59/44* (2006.01)
*H01J 49/00* (2006.01)

(52) U.S. Cl. ........ 250/282; 250/281; 250/283; 250/287; 250/288; 250/289; 250/290; 250/291; 250/292

(58) Field of Classification Search .......... 250/281–283, 250/287–292
See application file for complete search history.

(56) References Cited

U.S. PATENT DOCUMENTS 5,294,797 A * 3/1994 Frey et al. .................... 250/427
6,683,300 B2 * 1/2004 Doroshenko et al. ......... 250/288
(Continued)

FOREIGN PATENT DOCUMENTS

WO 03031074 A1 4/2003
WO 2006064048 A1 6/2006

OTHER PUBLICATIONS

Jurg, M.D., Laiko, V.V., Doroshenko, V.M., Zenobi, R. "Interfacing liquid chormatography with atmospheric pressure MALDI-MS", Anal. Bioannl. Chem., 383,895-902, 2005.*

(Continued)

*Primary Examiner* — Nikita Wells
*Assistant Examiner* — Meenakshi Sahu
(74) *Attorney, Agent, or Firm* — Howard IP Law Group, P.C.

(57) ABSTRACT

The invention relates to a method and an apparatus for providing a sample for a subsequent analysis of the sample, particularly for analyzing biomolecules, comprising the following steps: generating a free micro liquid jet in an environment having a predetermined pressure, wherein the micro liquid jet contains a carrier liquid and the sample to be analyzed, and dispersing the micro liquid jet into droplets containing the sample, wherein the environment surrounding the micro liquid jet is a gaseous environment in which the pressure is above vacuum conditions.

27 Claims, 3 Drawing Sheets

U.S. PATENT DOCUMENTS

2004/0222373 A1 11/2004 Oser et al.

OTHER PUBLICATIONS

Smith, R.D., Light-Wahl, K.J.,"The Observation of Non-covalent Interactions in solution by electrospray ionizatio Mass Spectrometry: Promise, Pitfalls, Prognsis", Biological MAss Spectrometry, vol. 22, 493-501 (1993).*

G.I. Taylor: "Electrically driven jets", Proc. Roy. Soc. Lond. A313, 453-475 (1969).

M.G. Stockman et al.: "The nonaxisymmetric (buckling) flow regime of fast capillary jets" Phys. Fluids, vol. 25, 1982, p. 1506-1511.

Charvat A. et al "New design for a time-of-flight mass spectrometer with a liquid beam laser desorption ion source for the analysis of biomolecules", Review of scientific instruments, AIP, Melville, NY, US vol. 75, No. 5, May 1, 2004, pp. 1209-1218.

M. J. McCarthy et al.: "Review of the Stability of Liquid Jets and the Influence of Nozzle Designs", The Chemical Engineering Journal, vol. 7, 1974, p. 1-20.

* cited by examiner

METHOD AND APPARATUS FOR PROVIDING A SAMPLE FOR A SUBSEQUENT ANALYSIS

This application is the national stage application under 35 U.S.C. §371 of the International Application No. PCT/EP2008/005736 and claims the benefit of Int'l. Application No. PCT/EP2008/005736, filed Jul. 14, 2008 and European Patent Application No. 07013904.3, filed Jul. 16, 2007, the entire disclosures of which are incorporated herein by reference in their entireties.

The invention relates to a method and an apparatus for providing a sample for a subsequent analysis of the sample, particularly for analysing biomolecules.

STATE OF THE ART

A conventional method for providing a sample for a subsequent analysis, e.g. by mass spectroscopy, is the so-called laser induced liquid beam ionization desorption (LILBID), which is disclosed, for example, in WO 2006/064048 A1. Here, a liquid flow including a carrier liquid and the sample to be analysed is injected into a vacuum chamber by a nozzle, so that a micro liquid jet is generated within the vacuum chamber. Then, a focussed laser beam is directed laterally onto the micro liquid jet thereby inducing the well-known matrix assisted laser desorption (or: dispersion) ionization (MALDI), wherein the carrier liquid constitutes the matrix. The samples desorbed from the micro liquid jet by MALDI can then be analysed by, e.g., a mass spectrometer.

However, the afore-mentioned laser induced liquid beam ionization desorption (LILBID) is quite expensive in fabrication and operation since it is necessary to generate and maintain a vacuum.

Another conventional method for analysing a sample by mass spectroscopy is described in US 2004/0222373 A1, wherein a carrier liquid including the sample is injected through a nozzle into a chamber at atmospheric of reduced pressure.

This technique has disadvantages in terms of operational capacity and positional precision of providing the sample in the chamber as liquid droplets are generated with the nozzle only. Furthermore, the liquid droplets have a diameter above 100 μm, which may be a disadvantage in terms of substance consumption. Finally, this technique is not adapted for LILBID, but for a multi photon ionization which may have unwanted effects on the sample.

SUMMARY OF THE INVENTION

Therefore, it is an object of the invention to improve the conventional laser induced liquid beam ionization desorption.

This object is achieved by a method and a corresponding apparatus according to the independent claims.

The method and apparatus according to the invention also provide the step of generating a free micro liquid jet in an environment having a predetermined pressure, wherein the micro liquid jet contains a carrier liquid and the sample to be analysed. Preferably, the micro liquid jet is generated in a conventional manner as disclosed, e.g. in WO 2006/064048 A1, which is therefore incorporated herein by reference.

Further, the method and apparatus according to the invention provides the step of dispersing the micro liquid jet into droplets containing the sample. The dispersing of the micro liquid jet into droplets is preferably achieved by directing a laser beam onto the micro liquid jet, which will be explained in detail later.

In contrast to the initially mentioned state of the art according to WO 2006/064048 A1, the invention provides that the micro liquid jet is generated not under vacuum conditions but in a gaseous environment in which the pressure is above vacuum conditions.

Preferably, the pressure in the gaseous environment surrounding the micro liquid jet is in the range between 900 mbar and 1100 mbar. However, the invention is not restricted to the afore-mentioned pressure range. For example, the pressure in the gaseous environment surrounding the micro liquid jet might be greater than 100 mbar, 250 mbar, 500 mbar, 750 mbar or 900 mbar and/or smaller than 10 bar, 5 bar, 2500 mbar or 1500 mbar.

In the past, there were the following preconceptions against the generation of a micro liquid jet under atmospheric pressure.

Firstly, it was assumed that atmospheric pressure negatively affects the stability of the micro liquid jet, which is however necessary for laser induced liquid beam ionization desorption (LILBID).

Further, it was assumed that the desorption (or: isolation) of the samples out of the carrier liquid of the micro liquid jet is more difficult under atmospheric pressure than under vacuum conditions.

Finally, the persons skilled in the art assumed that any samples desorbed from the micro liquid jet would be hindered by the atmospheric pressure to travel to the detector (e.g. a mass spectrometer).

However, in the preferred embodiment the pressure in the gaseous environment surrounding the micro liquid jet amounts to substantially atmospheric pressure, i.e. 1 bar.

The atmospheric pressure in the gaseous environment surrounding the micro liquid jet offers two advantages.

Firstly, the fabrication and operation of the apparatus according to the invention is much easier since it is not necessary to generate a vacuum.

The advantage of the ambient atmosphere in the ion source is at least twofold (with respect to the vacuum LILBIB):

1. The laser-induced dispersion generates droplets/molecular ions with high translation velocities of few km per second (for a molecule with 10000 Da is the kinetic energy in the keV range). Molecules with such a high kinetic energy are difficult to "image" with a mass spectrometer. In gaseous environments at atmospheric pressure, however, due to the frequent collisions, the velocity decays rapidly to its thermal value (10 kDa molecule has a thermal velocity of about 20 m per second at 20° C.) well before entering the mass spectrometer and therefore the mass resolution improves significantly.
2. In vacuum, the desolvation of created nanodroplets is hindered due to the strong effect of evaporative cooling. In order to loose all the solvent, the nanodroplet should be either small or very hot. At the atmosphere, however, the desolvation is assisted by collisions with the ambient gas. In addition, this process lasts longer and also bigger droplets can be completely desolvated.

Further, the method and apparatus according to the invention preferably also comprises the analysis of the sample contained in the nanodroplets, which have been dispersed from the micro liquid jet. For example, a conventional mass spectrometer can be used for analysing the sample. However, the invention is not restricted to the use of a mass spectrometer for analysing the samples. Instead, other types of analysing apparatus or instrumentation can be used in the framework of the invention.

If the analysing apparatus comprises a vacuum chamber as in case of a conventional mass spectrometer, an atmospheric pressure interface (API) is preferably used for introducing the droplets into the vacuum chamber of the analysing apparatus. The function and design of conventional atmospheric pressure interfaces are disclosed in, e.g., U.S. Pat. No. 6,683,300 B2 including the references cited therein. Therefore, the entire content of U.S. Pat. No. 6,683,300 B2 and the references cited therein is incorporated herein by reference with regard to the design of the atmospheric pressure interface.

Further, the generation of a stable micro liquid jet atmospheric pressure is preferably facilitated by applying an electric field to the micro liquid jet thereby stabilizing and forming the micro liquid jet, in particular extending the continuous part thereof. Applying the electric field may provide advantages in particular at low flow rates of the micro liquid jet. The electric field can be applied e.g. to the nozzle or to the liquid in the nozzle or a reservoir. The interaction between electric fields and micro liquid jets is explained in G. I. Taylor: "Electrically driven jets", Proc. Roy. Soc. Lond. A 313, 453-475 (1969), so that this reference is incorporated herein by reference.

However, it should be noted that the electric field applied to the micro liquid jet might induce the so-called electro spray ionization (ESI), which is undesirable in the framework of the invention. Therefore, the field strength of the electric field applied to the micro liquid jet is preferably adjusted such that substantially no electro spray ionization of the micro liquid jet occurs.

However, the operating range of the invention should not be restricted unnecessarily by avoiding electro spray ionization. Therefore, the field strength of the electric field applied to the micro liquid jet is preferably held below a certain threshold at which electro spray ionization begins, wherein there should be a small safety margin between the actual field strength and the electro spray ionization threshold, so that no electro spray ionization takes place. For example, the field strength of the electric field applied to the micro liquid jet can be in a small range below the electro spray ionization threshold, wherein the range is smaller than 30%, 20%, 10% or even smaller than 5% of the electro spray ionization threshold of the field strength.

It has already been mentioned that the micro liquid jet is preferably dispersed into droplets by directing a laser beam onto a continuous part of the micro liquid jet.

However, it is alternatively possible to direct the laser beam onto the discontinous part of the micro liquid jet in which the micro liquid jet is a succession of droplets.

In this connection it should be mentioned that the carrier liquid contained in the micro liquid jet comprises a maximum absorption wavelength at which the light absorption of the carrier liquid is a maximum. Therefore, the laser beam directed onto the micro liquid jet preferably comprises a wavelength, which is substantially identical to the maximum absorption wavelength of the carrier liquid, so that a large portion of the laser energy is absorbed by the carrier liquid thereby enhancing or causing the dispersion of the micro liquid jet into the droplets.

In case of water or aqueous solutions as a carrier liquid, the wavelength of the laser beam is therefore substantially 2.9 μm.

For example, the laser beam can be generated by an infrared (IR) laser. However, the invention is not restricted to the use of an IR laser for dispersing the micro liquid jet into the droplets. Depending on the physical properties of the carrier liquid and the sample to be analysed, other types of lasers can be used, as well.

Further, it should be noted that the laser beam preferably hits the micro liquid jet from one side of the micro liquid jet and the droplets dispersed from the micro liquid jet travel to the opposite side of the micro liquid jet for the subsequent analysis. This is advantageous since the dispersion is connected with the generation of shockwaves, so that the thermal stress is lower on the side of the micro liquid jet opposite the laser beam. Merely it may be the temperature that is lower on the shadow side with respect to the irradiated side, provided the penetration depth of the laser radiation (inverse of the absorption coefficient) is smaller than the diameter of the micro beam (for instance, at 2800 nm the penetration depth is only about 1 μm).

It should further be mentioned that the droplets dispersed from the micro liquid jet preferably have a size in the range of nanometers.

Further, the droplets dispersed from the micro liquid jet are preferably electrically charged due to statistical charging upon the laser induced dispersion, wherein the charge of the droplets is statistically distributed and varies among the droplets.

An alternative method for electrically charging the droplets is the so-called atmospheric pressure chemical ionization (APCI), which can be used in the framework of the invention. This method is particularly useful in case of non-polar molecules which cannot be charged by laser induced liquid beam ionization desorption (LILBID) alone.

Further, the droplets can be electrically charged by directing an electron beam onto the droplets, wherein the electron beam is preferably alligned perpendicular to the succession of droplets desorbed from the micro liquid jet.

Moreover, the droplets typically contain a low concentration of the sample, wherein the concentration can be lower than 20 μmol/1, 10 μmol/1, 5 μmol/1, 2 μmol/1, 1 μmol/1, 500 nmol/1 or even lower than 200 nmol/1

It should also be noted that the micro liquid jet preferably comprises a flow rate of less than 500 μl/min, 250 μl/min, 100 μl/min, 50 μl/min, 20 μl/min or less than 50 μl/min.

Moreover, the micro liquid jet comprises a flow speed, which is preferably smaller than 200 m/s and/or greater than 2 m/s, in particular 5 m/s, e.g. 20 m/s.

The diameter of the micro liquid jet is preferably greater than 1 μm and/or smaller than 100 μm. Advantageously, a reduced mass flow can be obtained in comparison with conventional analysing techniques. With particularly preferred embodiments, the diameter is selected in the range of 1 μm to 30 μm, e.g. 1 μm to 20 μm. The latter range is particularly preferred for analytic applications of the invention.

Finally, the micro liquid jet preferably comprises a continuous part upstream before a point at which the micro liquid jet decomposes into successive droplets. The continuous part of the micro liquid jet preferably comprises a length of 1-2 mm. Operation conditions of the micro nozzle are set as it is known in the art (e.g. M. J. McCarthy et al. in "The Chemical Engineering Journal" vol. 7, 1974, p. 1-20, or M. G. Stockman et al. in "Phys. Fluids" vol. 25, 1982, p. 1506-1511), so that the micro liquid jet leaving the micro nozzle has the continuous part.

DETAILED DESCRIPTION OF THE DRAWINGS

Figure 1:
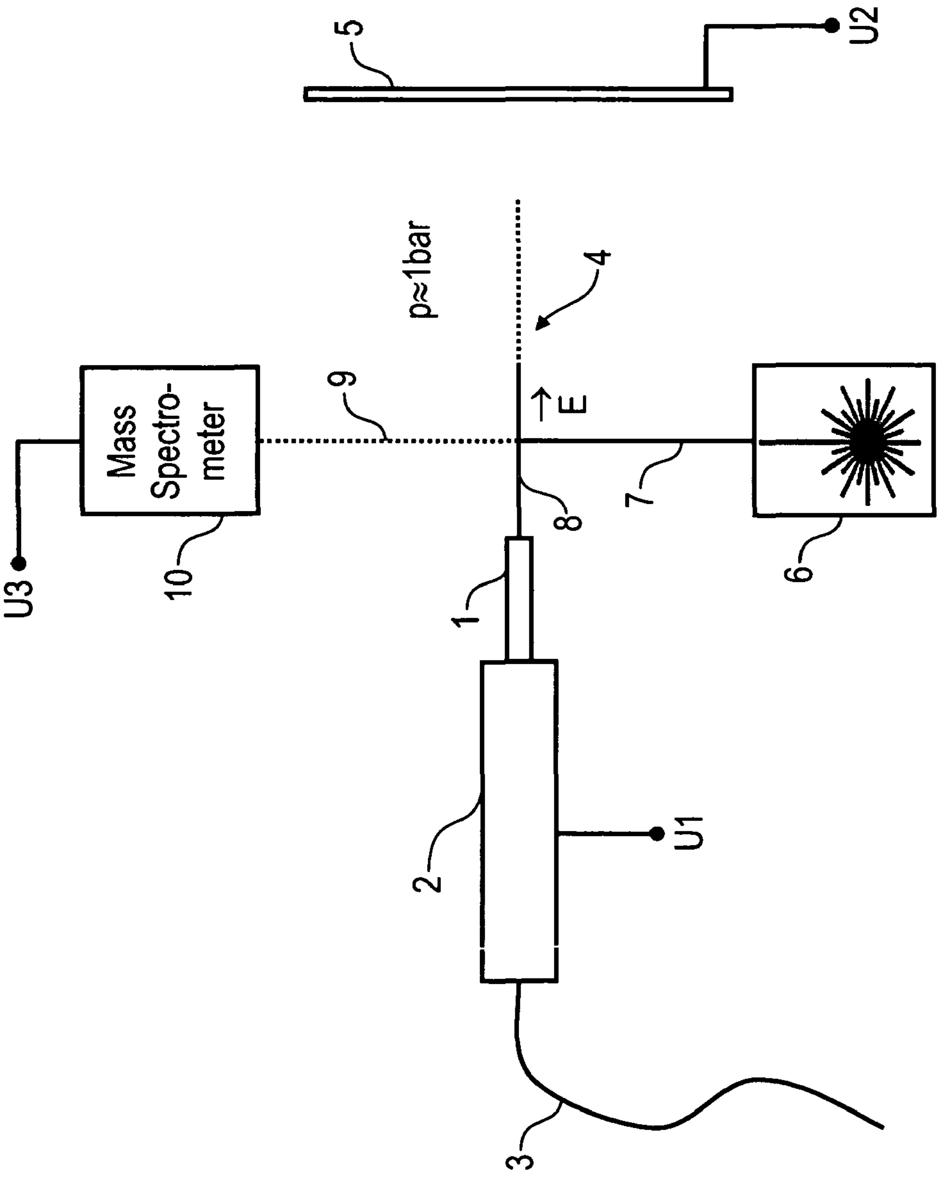
FIG. 1 is an illustration of an apparatus according to the invention for laser induced liquid beam ionization desorption.
Figure 2:
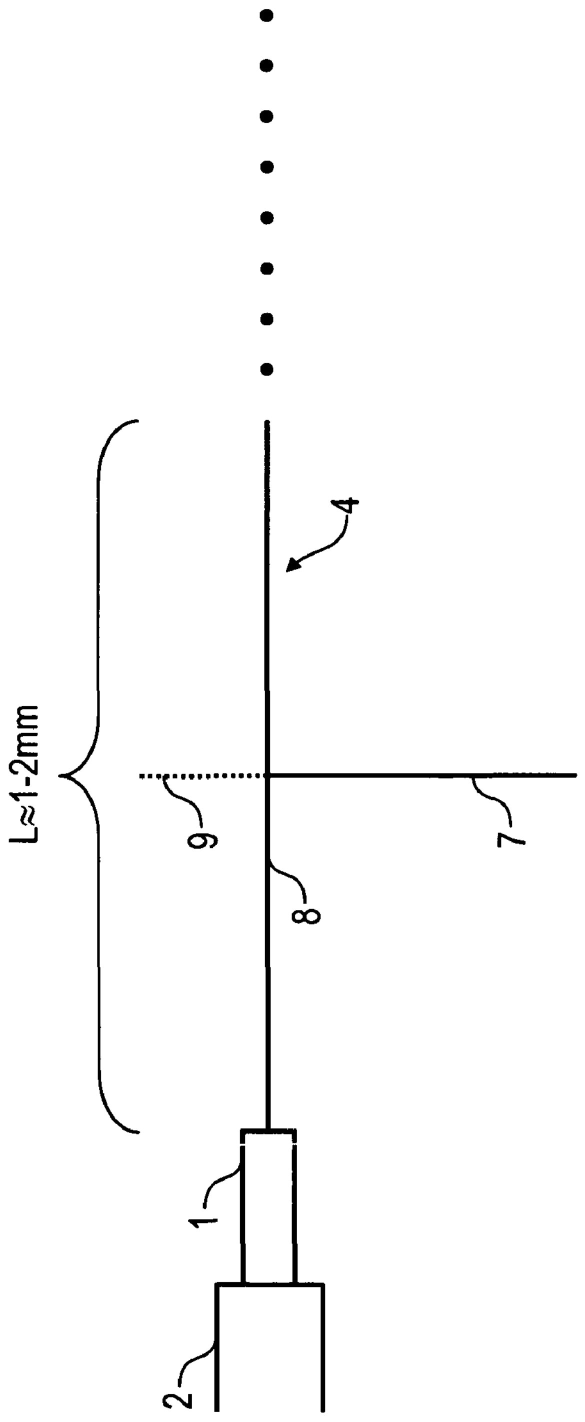
FIG. 2 is an enlarged view of a continuous region of the micro liquid jet in FIG. 1.

The apparatus shown in the drawings comprises a micro nozzle 1, which is mounted in a nozzle bracket 2 and which is supplied with a liquid by a supply line 3.

The liquid supplied by the supply line 3 contains a carrier liquid (e.g. water) and samples (e.g. biomolecules), which are dissolved or suspended in the carrier liquid.

The micro nozzle 1 injects a micro liquid jet 4 into a gaseous environment in which the pressure amounts to substantially atmospheric pressure, i.e. lbar.

Further, the apparatus generates an electric field, which can be used at low flow rates for stabilizing the micro liquid jet 4, so that the micro liquid jet 4 is stable even under atmospheric pressure. Therefore, a first electrode is formed by the nozzle bracket 2 and a first voltage U1 is applied to the nozzle bracket 2. Further, a second electrode 5 is disposed downstream the micro nozzle 1 and a second voltage U2 is applied to the second electrode 5, so that an electrical field is applied to the micro liquid jet 4, wherein the electric field is aligned parallel to the micro liquid jet 4. The interaction between the micro liquid jet 4 and the electric field is explained in detail in G. I. Taylor: "Electrically driven jets", Proc. Roy. Soc. Lond. A 313, 453-475 (1969), so that the content of this reference is herein incorporated by reference.

Further, the apparatus comprises an infrared (IR) laser 6 directing a laser beam 7 onto a continuous part 8 of the micro liquid jet 4 thereby dispersing the micro liquid jet 4 into droplets 9 containing a low concentration of the samples.

The droplets 9 are introduced into a mass spectrometer 10 via an atmospheric pressure interface (API), which is not shown.

The mass spectrometer 10 comprises an electrode to which a third voltage U3 is applied, so that the droplets 9 move to the mass spectrometer 10 under the effect of an electric field.

Figure 3:
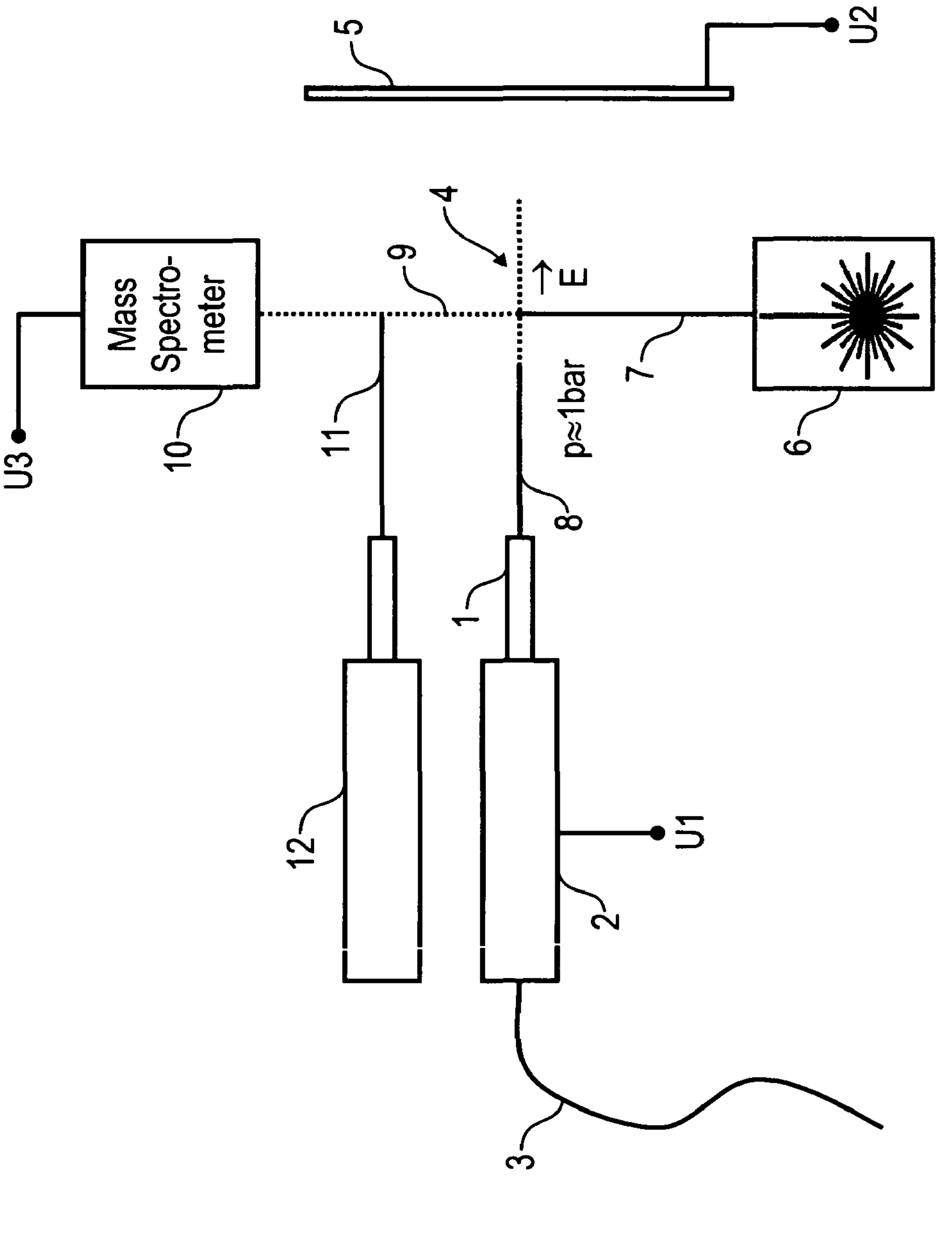
FIG. 3 is an alternative embodiment in which the droplets desorbed from the micro liquid jet are additionally charged by an electron beam.

FIG. 3 illustrates an alternative embodiment which largely corresponds to FIG. 1 so that reference is made to the above description.

However, in this embodiment, the laser beam 7 is not directed onto the continuous part 8 of the micro liquid 4. Instead, the laser beam 7 hits the micro liquid jet 4 downstream the continuous part 8 where the micro liquid jet 4 is merely a succession of droplets.

Further, the droplets 9 are additionally charged by an electron beam 11, which is generated by an electron beam source 12 and directed onto the droplets 9.

Additional modifications and variations of the present invention are possible in light of the above teachings. It is therefore to be understood that within the scope of the appended claims the invention maybe practised otherwise than as specifically described herein.

LIST OF REFERENCE NUMERALS

1 Micro nozzle
2 Nozzle bracket
3 Supply line
4 Micro liquid jet
5 Electrode
6 Laser
7 Laser beam
8 Continuous part of the laser beam
9 Droplets
10 Mass spectrometer
11 Electron beam
12 Electron beam source

The invention claimed is:

1. Method for providing a sample for a subsequent analysis of the sample, comprising the following steps:
- generating a free micro liquid jet in an environment having a predetermined pressure, wherein:
  - an environment surrounding the micro liquid jet is a gaseous environment in which the pressure is greater than vacuum conditions;
  - the micro liquid jet contains a carrier liquid and the sample to be analyzed, and
  - the micro liquid jet comprises a free continuous part upstream before a point at which the micro liquid jet decomposes into successive droplets which form a discontinuous part of the micro liquid jet;
- dispersing the free continuous part of the micro liquid jet into droplets, wherein the droplets contain the sample, and the micro liquid jet is dispersed into the droplets by directing a laser beam onto the free continuous part of the micro liquid jet.

2. Method according to claim 1, wherein the pressure of the gaseous environment surrounding the micro liquid jet amounts to substantially atmospheric pressure.

3. Method according to claim 1, further comprising the following step:
- analysis of the sample contained in the droplets.

4. Method according to claim 3, wherein the sample contained in the droplets is analyzed by mass spectroscopy.

5. Method according to claim 1, further comprising the following step:
- applying an electric field to the micro liquid jet by an external electric voltage, wherein the electric field can be used for stabilizing the micro liquid jet.

6. Method according to claim 5, wherein the electric field is aligned substantially parallel to the micro liquid jet.

7. Method according to claim 5, wherein the field strength of the electric field is adjusted such that substantially no electro spray ionization of the micro liquid jet occurs.

8. Method according to claim 7, wherein the field strength is within a predetermined range below a certain threshold at which electro spray ionization begins, wherein the range is smaller than a percentage value of the threshold, wherein the percentage value is selected from a group consisting of: 30%, 20%, 10% and 5%.

9. Method according to claim 1, wherein
- the carrier liquid comprises a maximum absorption wavelength at which the light absorption of the carrier liquid is a maximum, and
- the laser beam comprises a wavelength, which is substantially identical to the maximum absorption wavelength of the carrier liquid.

10. Method according to claim 1, wherein the carrier liquid is water and the wavelength of the laser beam is substantially 2.9 μm.

11. Method according to claim 1, wherein the laser beam is an infrared laser beam.

12. Method according to claim 1, wherein the laser beam hits the micro liquid jet from one side of the micro liquid jet and the droplets dispersed from the micro liquid jet travel to the opposite side of the micro liquid jet for the subsequent analysis.

13. Method according to claim 1, wherein the droplets are electrically charged due to the laser induced dispersion.

14. Method according to claim 1, wherein the droplets have a size in a nanometer range.

15. Method according to claim 1, further comprising the following step:

electrically charging the droplets dispersed from the micro liquid jet.

16. Apparatus for providing a sample for a subsequent analysis of the sample, comprising:

a micro-nozzle adapted to inject a free micro liquid jet into a gaseous environment having a predetermined pressure above vacuum conditions, said micro liquid jet having a free continuous part upstream before a point at which the micro liquid jet decomposes into successive droplets which form a discontinuous part of the micro liquid jet, wherein the micro liquid jet contains a carrier liquid and at least one sample to be analyzed, and a laser for generating a laser beam directed onto the free continuous part of the micro liquid jet to disperse the micro liquid jet into the successive droplets, wherein the droplets contain the sample.

17. Apparatus according to claim 16, wherein the pressure of the gaseous environment surrounding the micro liquid jet amounts to substantially atmospheric pressure.

18. Apparatus according to claim 16, further comprising an analyzing apparatus for analyzing the sample contained in the droplets.

19. Apparatus according to claim 18, wherein the analyzing apparatus comprises a mass spectrometer.

20. Apparatus according to claim 19, further comprising an atmospheric pressure interface for introducing the droplets into a vacuum chamber of the mass spectrometer.

21. Apparatus according to claim 16, further comprising an electrode arrangement for applying an electric field to the micro liquid jet.

22. Apparatus according to claim 21, wherein the electrode arrangement comprises a first electrode and a second electrode, the first electrode is formed by the micro-nozzle, and the second electrode is disposed downstream from the micro-nozzle.

23. Apparatus according to claim 16, wherein the laser is an infrared laser.

24. Apparatus according claim 16, wherein the laser and the analyzing apparatus are disposed on opposite sides of the micro liquid jet.

25. Apparatus according to claim 16, further comprising an electron beam source directing an electron beam onto the droplets dispersed from the micro liquid jet thereby electrically charging the droplets.

26. Method according to claim 1, wherein the sample contains biomolecules.

27. Method according to claim 15, wherein the droplets are charged by directing an electron beam onto the droplets.

* * * * *